United States Patent
Colaiacomo et al.

(10) Patent No.: US 8,214,687 B2
(45) Date of Patent: Jul. 3, 2012

(54) DISASTER RECOVERY BASED ON JOURNALING EVENTS PRIORITIZATION IN INFORMATION TECHNOLOGY ENVIRONMENTS

(75) Inventors: Giovanni L. Colaiacomo, Rome (IT); Giuseppe Longobardi, Castellammare di Stabia (IT); Valeria Perticara', Rome (IT); Ilaria Rispoli, Rome (IT)

(73) Assignee: International Business Machines Corporation, Armonk, NY (US)

( * ) Notice: Subject to any disclaimer, the term of this patent is extended or adjusted under 35 U.S.C. 154(b) by 460 days.

(21) Appl. No.: 12/371,466

(22) Filed: Feb. 13, 2009

(65) Prior Publication Data
US 2010/0211822 A1    Aug. 19, 2010

(51) Int. Cl.
*G06F 11/00*    (2006.01)
(52) U.S. Cl. .............. 714/16; 714/15; 714/10; 714/2; 714/4.11
(58) Field of Classification Search ............. 714/2, 45, 714/48, 1, 411, 10, 15, 16, 4, 11
See application file for complete search history.

(56) References Cited

U.S. PATENT DOCUMENTS

| | | | |
|---|---|---|---|
| 5,247,675 A | 9/1993 | Farrell et al. | |
| 6,512,740 B1 | 1/2003 | Baniewicz et al. | |
| 6,785,786 B1 | 8/2004 | Gold et al. | |
| 6,880,051 B2 | 4/2005 | Timpanaro-Perrotta | |
| 7,240,234 B2 * | 7/2007 | Morita et al. | 714/4.11 |
| 7,266,718 B2 | 9/2007 | Idei et al. | |
| 7,415,505 B2 * | 8/2008 | Wang et al. | 709/207 |
| 7,725,768 B1 * | 5/2010 | Bezbaruah et al. | 714/15 |
| 2003/0061537 A1 * | 3/2003 | Cha et al. | 714/16 |
| 2004/0003319 A1 * | 1/2004 | Ukai et al. | 714/25 |
| 2004/0205110 A1 * | 10/2004 | Hinshaw | 709/201 |
| 2005/0268156 A1 * | 12/2005 | Mashayekhi et al. | 714/4 |
| 2005/0289385 A1 * | 12/2005 | Nakaya | 714/5 |
| 2006/0031649 A1 * | 2/2006 | Murotani et al. | 711/162 |
| 2006/0236151 A1 | 10/2006 | Costlow et al. | |

* cited by examiner

*Primary Examiner* — Scott Baderman
*Assistant Examiner* — Sarai Butler
(74) *Attorney, Agent, or Firm* — Delizio Gilliam, PLLC (57) ABSTRACT

Disaster recovery is performed based on journaling events prioritization in information in an information technology environment. One implementation involves prioritizing log file events for scheduling of jobs on a computing system, by logging events concerning each job execution plan, in a log file, and for disaster recovery, prioritizing logged events based on corresponding job urgency and relevance level and performing recovery by reapplying the events of log files in the priority order such that more urgent and relevant jobs are recovered first.

20 Claims, 7 Drawing Sheets

DISASTER RECOVERY BASED ON JOURNALING EVENTS PRIORITIZATION IN INFORMATION TECHNOLOGY ENVIRONMENTS

BACKGROUND

The present invention relates generally to information technology (IT) environments, and more particularly, to disaster recovery in IT environments.

In information technology (IT) environments, typically after a disaster or a severe system problem, there is a process for recovery of the computing systems and restarting the business, based on a disaster-recovery or service-restore preparedness plan. This should occur as soon as possible. However, a side effect of such disaster recovery is that disruption of the business still occurs, and it may be too late to recover all the activity that was running at the time the problem occurred. A completely duplicate system may be used, performing synchronous backup for each "transaction". This is efficient in terms of recovery but requires duplicate resources. Alternatively, a checkpoint/journaling mechanism for tracking all the events may be used. However, it takes time to "reapply" each and all the events logged in the checkpoint/journal files, to reach the final running state.

BRIEF SUMMARY

Disaster recovery is performed based on journaling events prioritization in an information technology environment. One embodiment involves prioritizing log file events for scheduling of jobs on a computing system, by logging events concerning each job execution plan, in a log file, and for disaster recovery, prioritizing logged events based on corresponding job urgency and relevance level and performing recovery by reapplying the events of log files in the priority order such that more urgent and relevant jobs are recovered first.

Prioritizing logged events may further include identifying subsets of logged events, wherein in each subset, the events are to be replayed in the same order, and subsets of events can be replayed in any order, and in each subset, corresponding jobs share dependency information. Prioritizing logged events may further include assigning a priority to each subset, including for a subset concerning a set of completed execution jobs, assigning a lower priority than subsets concerning a set of incomplete execution jobs.

Assigning a priority to each subset may further include, for a subset concerning a set of incomplete execution jobs including critical jobs, assigning a higher priority than a subset concerning a set of incomplete execution jobs without critical jobs. Assigning a priority to each subset may further include, for a subset concerning a set of incomplete execution jobs including critical jobs having a first deadline, assigning a higher priority than a subset concerning a set of incomplete execution jobs including critical jobs having a second deadline, where the second deadline is later than the first deadline. Assigning a priority to each subset may further include, for multiple subsets each concerning a set of incomplete execution jobs including critical jobs, assigning priority by evaluating a function for each subset based on the concerned job completion deadlines, and assigning higher priority to the subsets based on the corresponding functions.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc. The description may disclose several preferred embodiments for information technology (IT) environments. While the following description will be described in terms of disaster recovery in IT environments for clarity and placing the invention in context, it should be kept in mind that the teachings herein may have broad application to all types of systems, devices and applications.

In one embodiment, the invention provides disaster recovery based on journaling events prioritization in information technology (IT) environments. One embodiment involves identifying a different level of urgency in the events logged in journaling (check-pointing) files to be reapplied, and to prioritize those more urgent, high priority events (assigning a priority to categorized events based on the urgency level), that are recovered first and then all the others. This allows restarting urgent activities before the entire restore phase completes.

One implementation involves maintaining journaling log files in a backup storage, the log files including events describing the ongoing state of an information technology environment including computing systems, data storage, applications/jobs and data. In one example, maintaining journaling log files includes logging events concerning a job execution plan in a log file. In case of a disaster or a severe system problem, disaster recovery involves reapplying log file events for scheduling of jobs on systems.

Reapplying said log file events includes identifying subsets of logged events according to the one or more of the following criteria: (1) in each subset, the events are replayed in a specific order, whereas the subsets themselves can be replayed in any order; (2) in each subset, the jobs share dependency information; (3) assigning a priority to each subset; and (4) reapplying the events of log files in the priority order as defined. Assigning a priority to each subset is according to the following criteria: (i) a subset concerning a set of jobs with execution already completed has a lower priority than subsets concerning a set of jobs still active; (ii) a subset concerning a set of jobs still active which contain critical jobs has a higher priority than a subset concerning a set of jobs still active which does not contain critical jobs; (iii) a subset concerning a set of active critical jobs close to a deadline has a higher priority than a subset concerning a set of active critical jobs not as close to the deadline; (iiii) a subset concerning a set of active critical jobs close to the deadline with a high network priority has an higher priority than a subset concerning a set of active critical jobs close to deadline with a lower network priority.

A recovery system according to the invention implements said event prioritization applied to a scheduling system. In the scheduling system, a new plan is created. Then each time an event updates the plan, the event is logged in a journaling file. When a severe problem occurs, the current plan status can be restored starting from the initial plan and based on priority selectively reapplying events logged in the journaling file to a last known state of the system.

The majority of logged events relate to job execution or modification, and need to be applied in a specific order. The invention identifies subsets of such events, wherein each event in a subset must be executed in a specific order. However, subsets of events can be executed in any order because each subset is independent from other subsets. In order to accelerate recovery of the high priority systems/jobs, according to an embodiment of the invention, priority is assigned to each subset, wherein high priority subsets (and consequently events) are reapplied immediately, before subsets with lower priority. As such, a critical recovery path is specified wherein the critical path applies said subsets starting from high priority to low priority.

In order to identify the subsets, a concept of network of jobs is utilized. A network of jobs can be identified using dependency information, wherein two jobs connected by a predecessor-successor dependency belong to the same network. A plan is made up of networks of jobs. Events related to jobs that belong to the same network make a subset.

Figure 1:
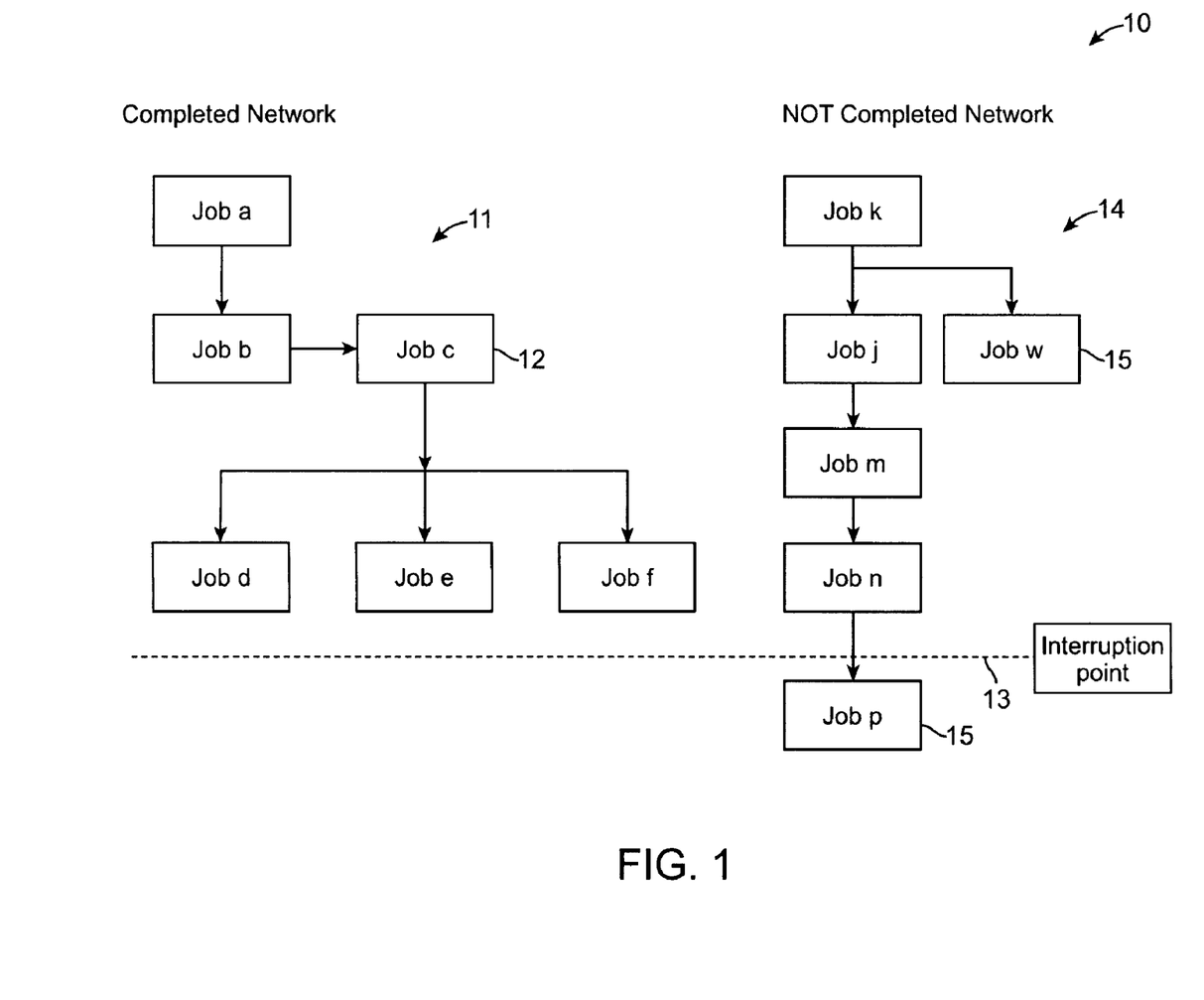
FIG. 1 illustrates a set of job networks including an active network and an inactive network, used in determining recovery priority in an information technology environment.
Figure 2:
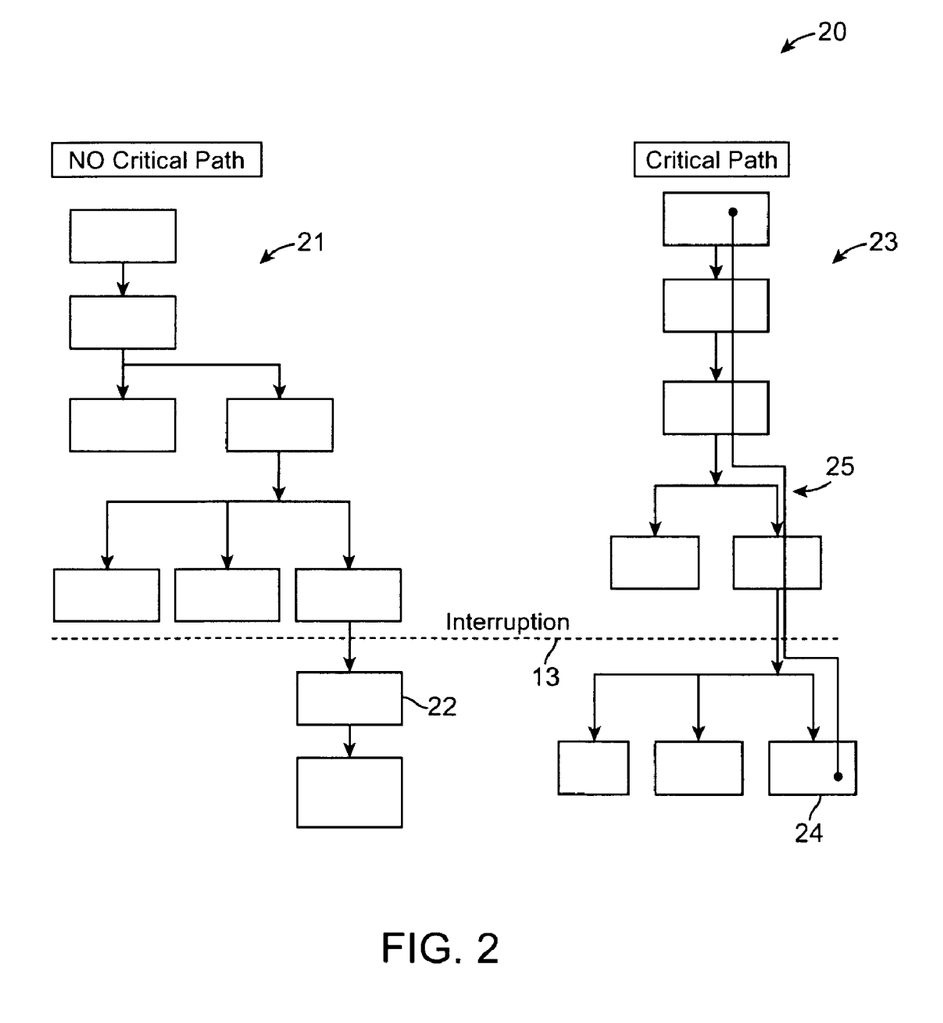
FIG. 2 illustrates a set of active job networks including an active network without a critical path and an active network with a critical path.
Figure 3:
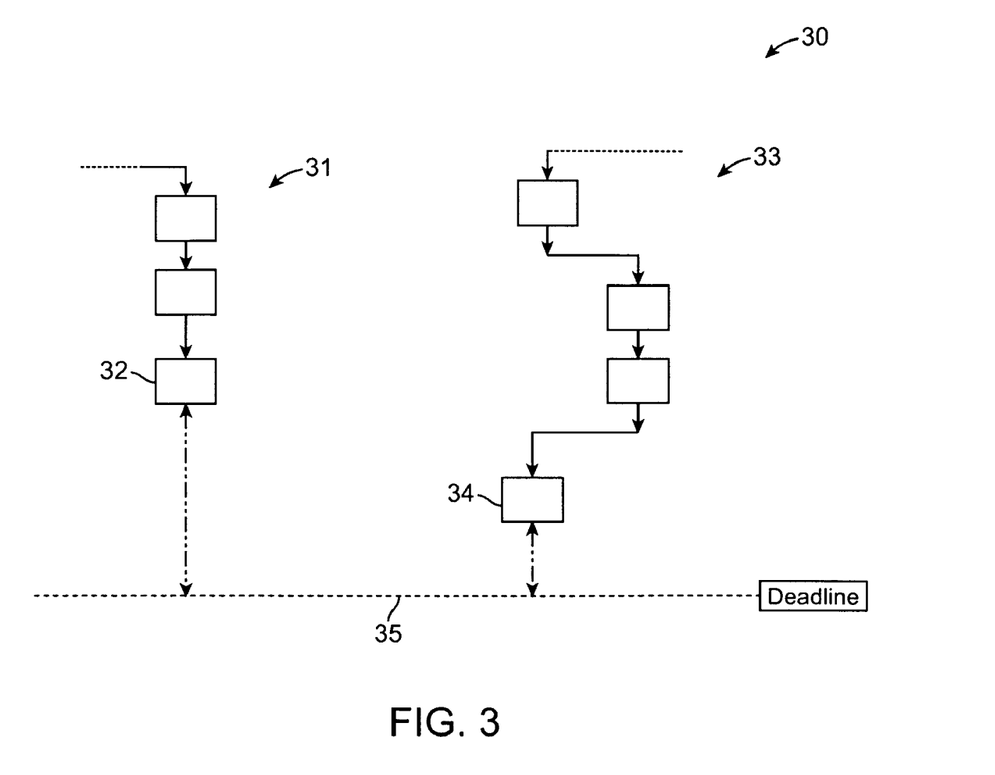
FIG. 3 illustrates a set of active job networks with differing remaining periods to deadlines for critical jobs.

In one example, a priority is assigned to each subset (i.e., job network) based on the evaluation and consideration of the following three factors:

1. Completed networks vs. active (not completed) networks. FIG. 1 shows an example of a set 10 of networks of jobs including a completed network 11 wherein all jobs 12 in the network 11 are completed before an interruption point in time 13 (e.g., due to disaster or system problems), and an active network 14 including jobs 15 wherein one or more jobs 15 (e.g., Job P) in the network 14 remains incomplete at said interruption point 13.
2. Active networks containing critical job vs. active networks not containing critical jobs. FIG. 2 shows an example of a set 20 of active networks of jobs. A first active network 21 includes incomplete jobs 22 that are not critical. A second active network 23 includes one or more incomplete critical jobs 24, which indicate a critical path 25 including such incomplete critical jobs 24.
3. Priority of incomplete critical jobs and their completion deadline. FIG. 3 shows an example of a set 30 of active networks of jobs. A first active network 31 includes at least one incomplete critical job 32. A second active network 33 includes at least one incomplete critical job 34. The critical job 32 is further away in time from the completion deadline threshold 35 than the critical job 34.

Based on the above factors, completed (inactive) networks are assigned very low priority to active networks, and can be recovered last. Among still active networks, a higher priority is assigned to those networks containing one or more critical jobs. Critical jobs can be identified in different ways, such as, jobs explicitly identified by the user as critical for business, or jobs considered critical by a job scheduler based on e.g., planned start and end time (deadline), etc.

Figure 4:
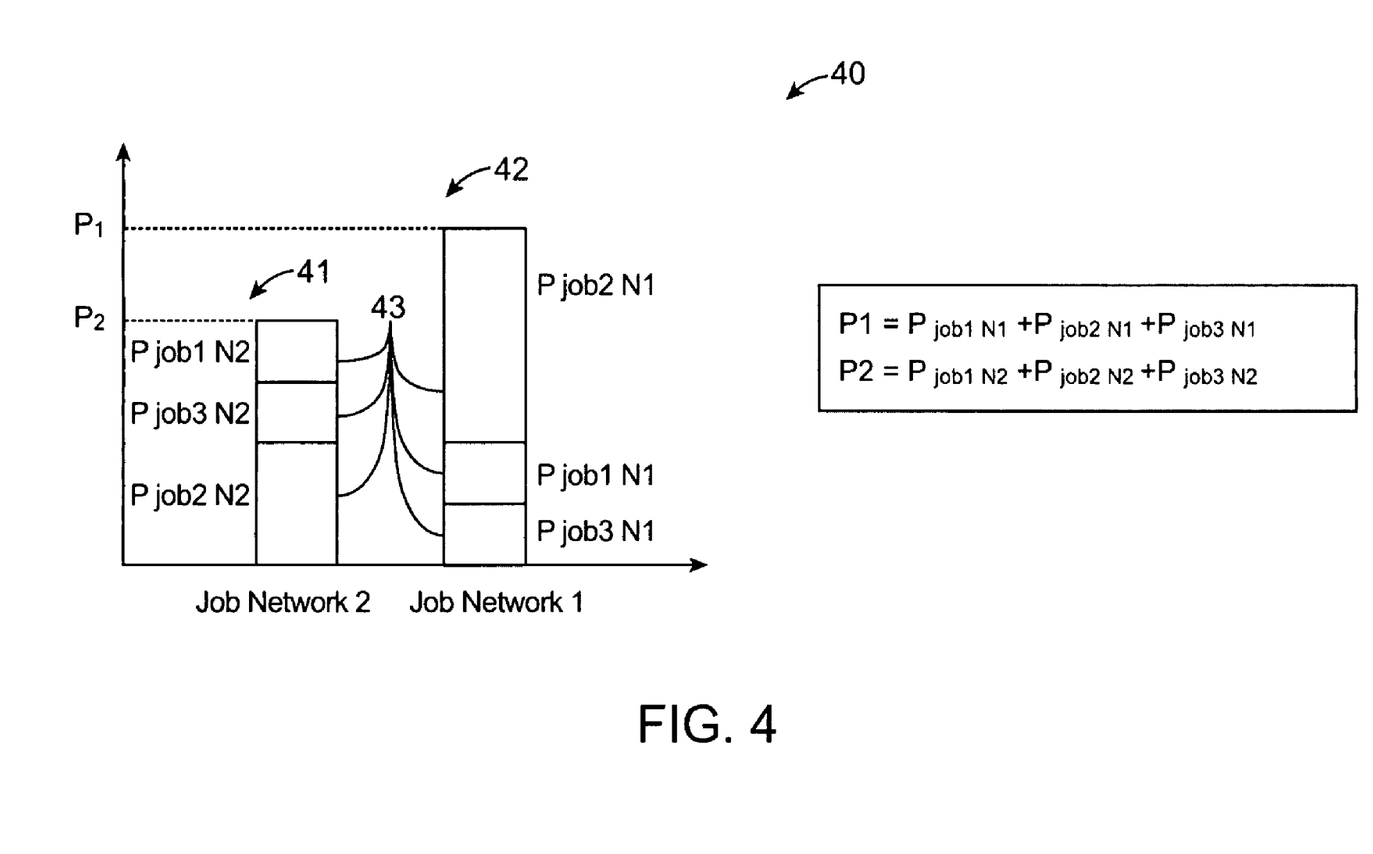
FIG. 4 shows an example priority calculation.

A further prioritization may be established among active networks containing critical jobs by considering critical jobs based on planned end time (i.e., how close they are in time to a planned completion deadline). If all the previous factors are equal, the priority of the component jobs in each network (subset) may be evaluated for assigning priority to the networks (subsets). The evaluation may be based on e.g., an algebraic sum of the component jobs priority in a network, or based on a weighted average of the most critical jobs component in a network, or other applicable algorithm. In this way, a priority evaluation process is used to determine the order in which event subsets (i.e., events for each network) are reapplied. FIG. 4 illustrates an example of the priority evaluation 40. In FIG. 4, the horizontal axis (x-axis) represents different job networks (e.g., Job Network 1 and Job Network 2). The vertical axis (y-axis) represents the total priority value of a job network. In this example, priority value P1 is the evaluated priority for Job Network 1, P2 is the evaluated priority value of Job Network 2. Each of the network bars 41, 42 includes blocks 43, where each block 43 represents the priority of a job in the network; the total priority of a job network is the sum (but it may be evaluated in several ways such as weighted average) of the single priority for each job component in the network. This type of criteriais applied if all the other criteria are equal for the compared networks.

For example, for reapplication, first active networks are selected, then among the selected active networks, those with critical paths (i.e., including critical jobs) are identified. Among the identified networks containing critical paths, the networks are assigned priority based on approaching deadlines of the component critical jobs. As such, inactive networks are assigned lowest priority, then active networks are prioritized based on approaching deadlines of the component critical jobs. For example, an active network having critical jobs with the shortest deadlines is selected as having the highest priority, wherein the event subset for that active network is assigned highest priority. An active network having critical jobs with the next shortest deadlines is selected as having the next highest priority, wherein the event subset for that active network is assigned next highest priority, etc. As such, the event subset for an active network having critical jobs with the shortest deadlines, is reapplied first. Then the event subset for an active network having critical jobs with the next shortest deadlines is reapplied next, etc.

Once an entire subset of events is reapplied, the scheduler and the user can start working on the related network of jobs, avoiding waiting for the complete reapply and restore of all the network of jobs.

Figure 5:
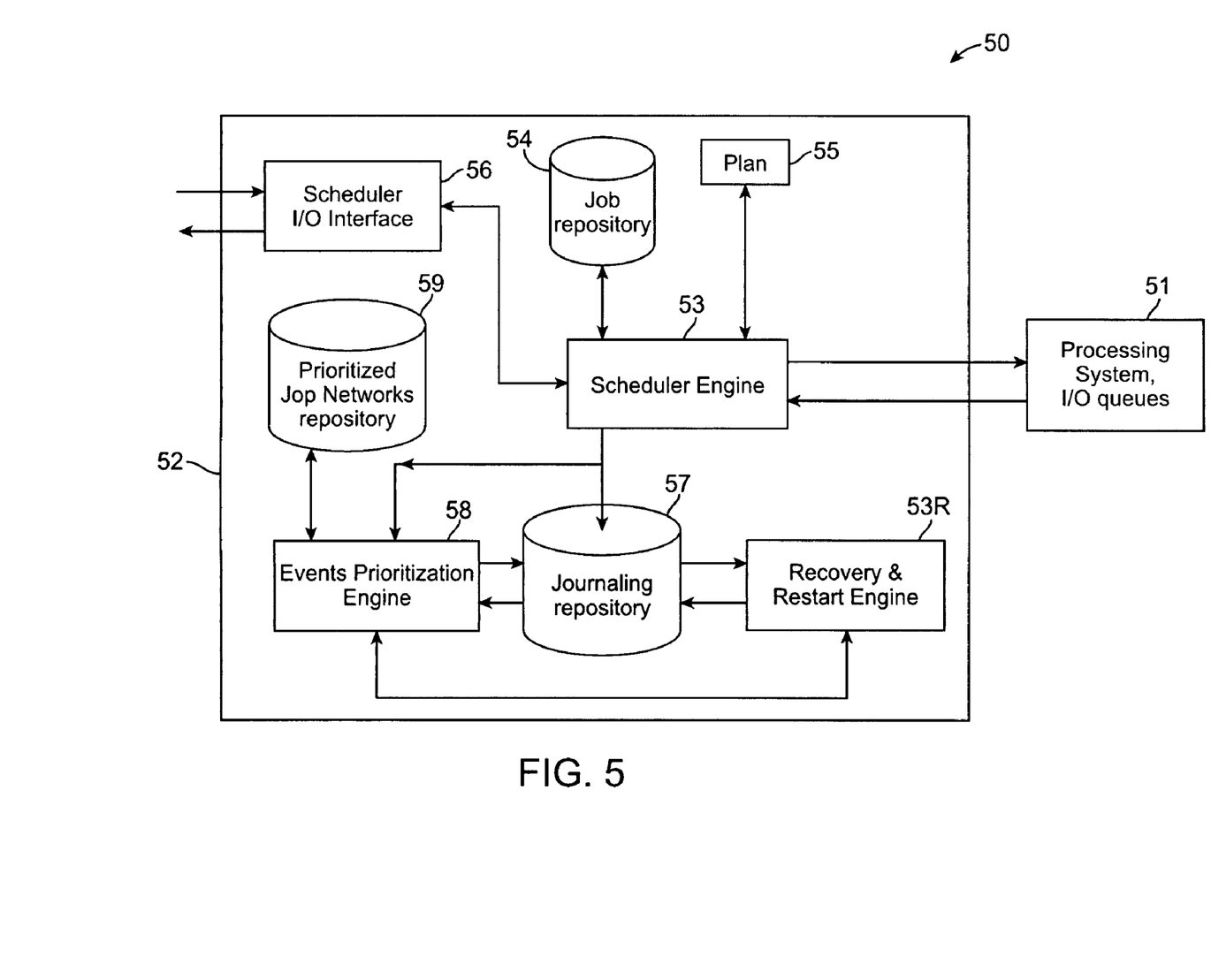
FIG. 5 shows an example system implementing disaster recovery based on journaling events prioritization in information.

FIG. 5 shows a functional block diagram of an information technology system 50 implementing a disaster recovery, according to an embodiment of the invention. The system 50 includes a processing system 51 for processing jobs and a disaster recovery system 52. The disaster recovery system 52 includes a scheduler engine 53 for scheduling jobs from a job repository 54 to be executed by the processing system 51 according to a plan 55. The scheduler engine 53 includes an interface 56 for I/O operations with other systems. The scheduler engine 53 further logs events in a journaling repository 57. The system 52 further includes an events prioritization engine 58 which prioritizes the journaled events, as described herein, and stores the prioritized events in a prioritized job networks repository 59, for reappplication by a recovery and restart engine 53R.

Figure 6:
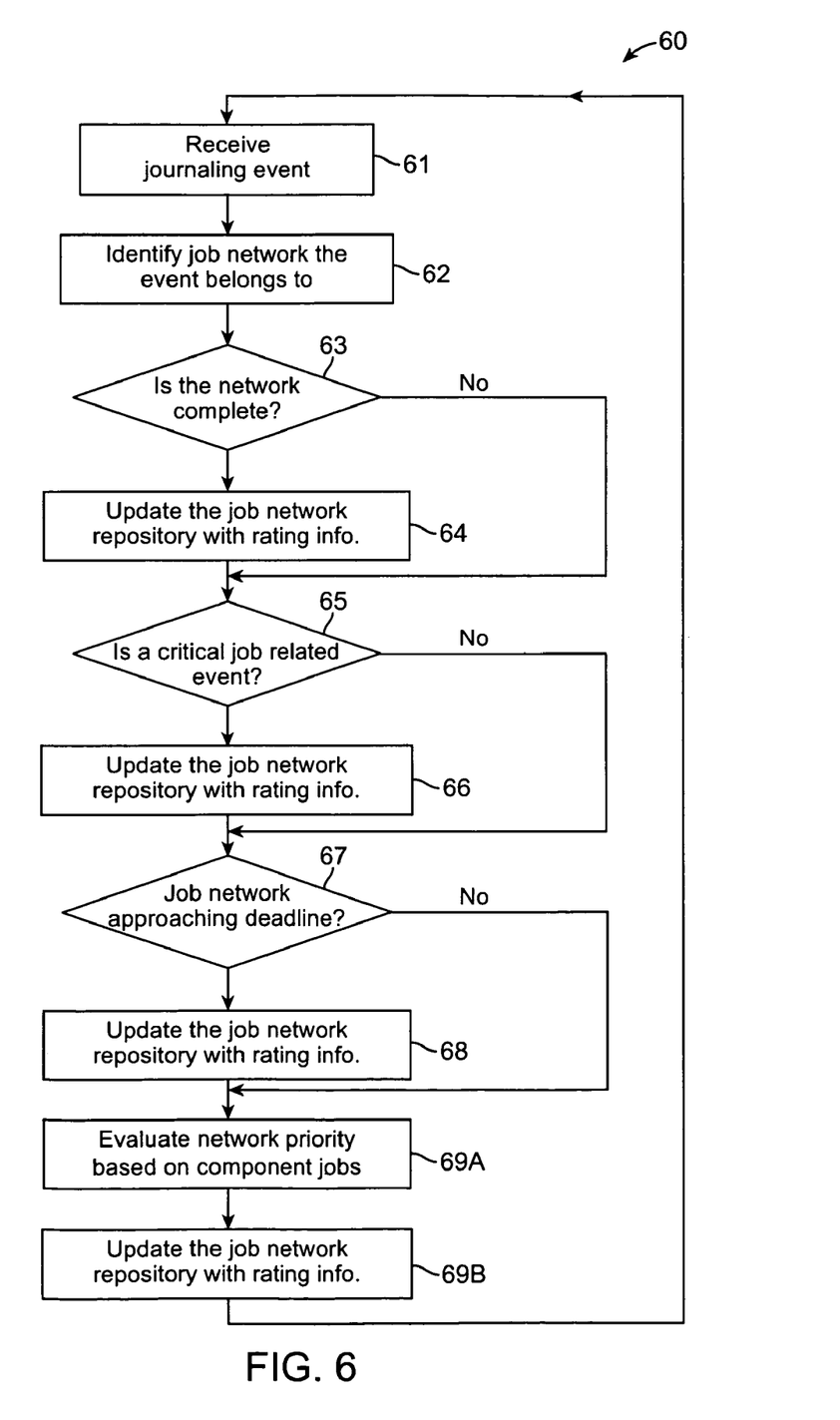
FIG. 6 shows an example process implementing disaster recovery based on journaling events prioritization in information.

FIG. 6 shows flowchart of an example prioritization process 60 implemented by the system 50. The process 60 includes:

Block 61: Receive a journaling event.

Block 62: Identify job network the event belongs to.

Block 63: Determine if the identified network is complete (i.e., inactive)? If yes, proceed to block 64, else proceed to block 65.

Block 64: The identified network is not an active network, as such, subset of events associated with the identified network are given lowest priority rating. Update the job network repository with the priority rating information for the identified network.

Block 65: Determine if any active jobs in the identified network is critical (i.e., any job component in the indentified network is still active (to be executed) and defined as critical job, identifying a critical path)? If yes, proceed to block 67, else proceed to block 66.

Block 66: The identified network is an active network with a critical job, as such, subset of events associated with the identified network are given higher priority rating. Update the job network repository with the priority rating information for the identified network.

Block 67: Determine if any jobs in the identified network have approaching deadlines? If yes, proceed to block 68, else proceed to block 69A.

Block 68: The identified network is an active network with a critical path having short deadlines, as such, subset of events associated with the identified network are given an even higher priority rating. Update the job network repository with the priority rating information for the identified network.

Block 69A: For further prioritization, evaluate network priority of the identified network relative to other active networks with critical paths, based on component jobs of each active network with a critical path, and assign a priority rating accordingly. This provides further prioritization among active networks containing critical jobs, by considering critical jobs based on planned end time (i.e., how close they are in time to a planned completion deadline). If all the previous factors are equal (i.e., active networks with critical paths having short deadlines), then the priority of the component jobs in each active network (subset) with a critical job having a short deadline is evaluated and compared for assigning priority to the networks (subsets). An example of network priority evaluation is shown in FIG. 4 where the priority P1 of Job Network 1 is evaluated as the sum of the priority of the Job Network 1 components jobs (e.g., as sum of three jobs priorities). The same for the Job Network 2. This evaluation is not limited to the sum may also use any more complex algorithms (e.g., weighting an average sum against the critical jobs), Block 69B: Update the job network repository with rating information of the identified network. Proceed to block 61.

Note that the steps 69A and 69B for performance reasons might be run only once at the beginning of the recovery phase and not for each event processing as shown in FIG. 6.

In a job scheduling area (e.g., a job scheduling domain application), the criteria used for prioritization of events categorized based on job network is based on corresponding job urgency (i.e., how urgent it is for the end user to have the job running after the disaster) and relevance level (i.e., how important it is for the end user to have the job running after the disaster: being the urgency the same, the relevance helps to order the job ranking). The relevance/importance of the data is based on properties of the data (e.g., chain of jobs) to be recovered/restored itself (e.g., the job is part of a critical path) and not on external additional settings to be evaluated or manually specified. In one example, based on prioritization, the data that may require most time to recover may need to be recovered first. As such, the restoring order is based on the relevance of the data, which is based on the characteristics of the data itself, wherein the most important/relevant are restored first. A priority evaluation process is used to drive the decision of the order in which event subsets can be reapplied. The prioritization reduces the time needed to restart critical activities, by restoring first main critical/relevant data. Such scheduling for restoring main critical/relevant data helps to continue with the planned activity reducing the time needed to restart the most important activity, after the recovery (critical path, approaching deadline, not completed, etc.).

Figure 7:
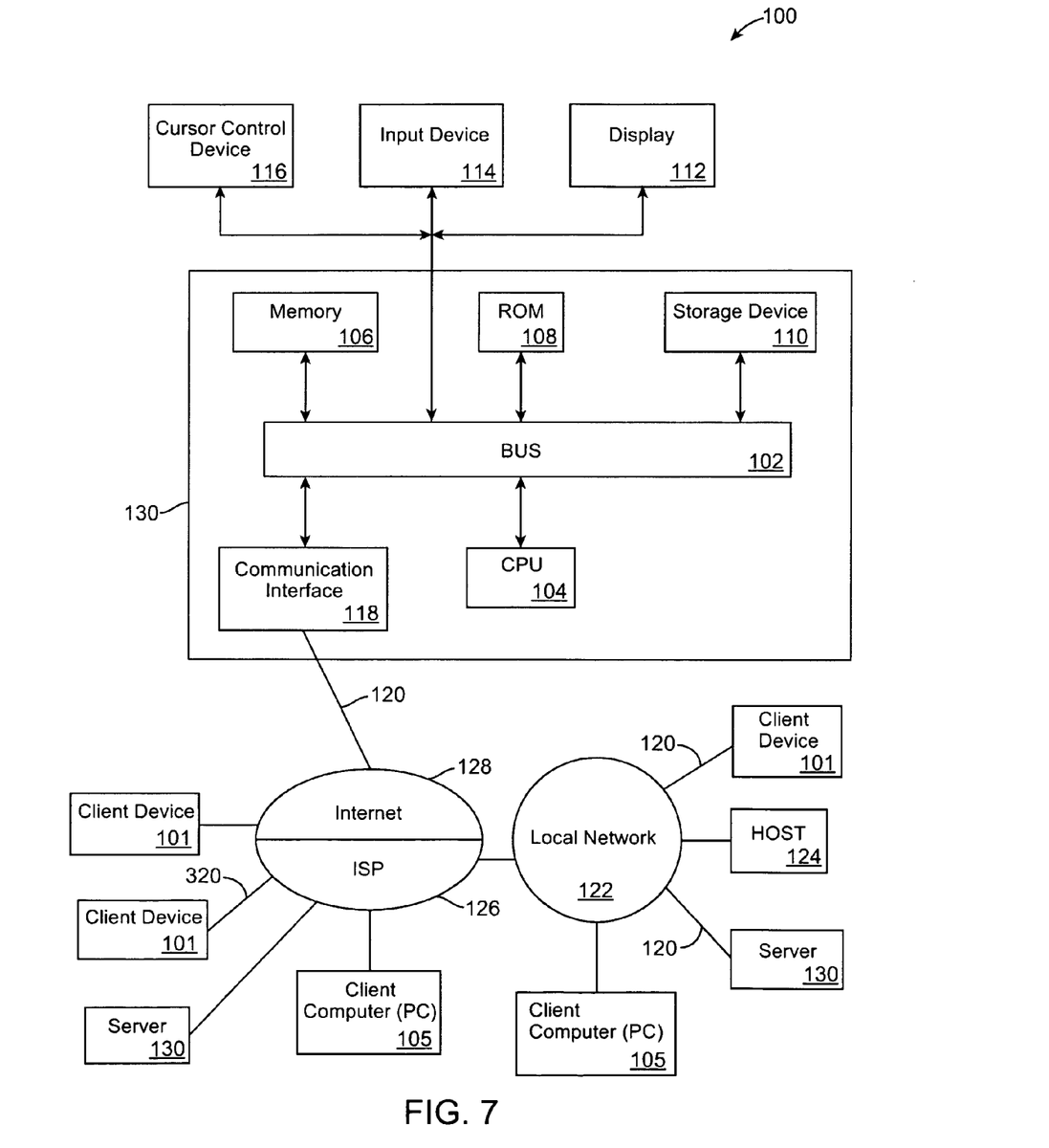
FIG. 7 illustrates an example computing system for implementing an embodiment of the invention.

FIG. 7 shows a block diagram of an example architecture of an embodiment of a system 100 for implementing an embodiment of the invention. The system 100 includes one or more client devices 101 connected to one or more server computing systems 130. A server 130 includes a bus 102 or other communication mechanisms for communicating information, and a processor (CPU) 104 coupled with the bus 102 for processing information. The server 130 also includes a main memory 106, such as a random access memory (RAM) or other dynamic storage device, coupled to the bus 102 for storing information and instructions to be executed by the processor 104. The main memory 106 also may be used for storing temporary variables or other intermediate information during execution or instructions to be executed by the processor 104. The server computer system 130 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions. The bus 102 may contain, for example, thirty-two address lines for addressing video memory or main memory 106. The bus 102 can also include, for example, a 32-bit data bus for transferring data between and among the components, such as the CPU 104, the main memory 106, video memory and the storage 110. Alternatively, multiplex data/address lines may be used instead of separate data and address lines.

The server 130 may be coupled via the bus 102 to a display 112 for displaying information to a computer user. An input device 114, including alphanumeric and other keys, is coupled to the bus 102 for communicating information and command selections to the processor 104. Another type of user input device comprises cursor control 116, such as a mouse, a trackball, or cursor direction keys for communicating direction information and command selections to the processor 104 and for controlling cursor movement on the display 112.

According to one embodiment of the invention, the functions of the system 52 (FIG. 5) are performed by the server 130 in response to the processor 104 executing one or more sequences of one or more instructions contained in the main memory 106. Such instructions may be read into the main memory 106 from another computer-readable medium, such as the storage device 110. Execution of the sequences of instructions contained in the main memory 106 causes the processor 104 to perform the process steps described herein. One or more processors in a multi-processing arrangement may also be employed to execute the sequences of instructions contained in the main memory 106. In alternative embodiments, hard-wired circuitry may be used in place of or in combination with software instructions to implement the invention. Thus, embodiments of the invention are not limited to any specific combination of hardware circuitry and software.

The terms "computer program medium," "computer usable medium," "computer readable medium," and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information, from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor or multi-core processor to perform the features of the computer system. Accordingly, such computer programs represent controllers of the computer system.

Generally, the term "computer-readable medium", as used herein, refers to any medium that participated in providing instructions to the processor 104 for execution. Such a medium may take many forms, including but not limited to, non-volatile media, volatile media and transmission media. Non-volatile media includes, for example, optical or magnetic disks, such as the storage device 110. Volatile media includes dynamic memory, such as the main memory 106. Transmission media includes coaxial cables, copper wire and fiber optics, including the wires that comprise the bus 102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 104 for execution. For example, the instructions may initially be carried on a magnetic disk of a remote computer. The remote computer can load the instructions into its dynamic memory and send the instructions over a telephone line using a modem. A modem local to the server 130 can receive the data on the telephone line and use an infrared transmitter to convert the data to an infrared signal. An infrared detector coupled to the bus 102 can receive the data carried in the infrared signal and place the data on the bus 102. The bus 102 carries the data to the main memory 106, from which the processor 104 retrieves and executes the instructions. The instructions received from the main memory 106 may optionally be stored on the storage device 110 either before or after execution by the processor 104.

The server 130 also includes a communication interface 118 coupled to the bus 102. The communication interface 118 provides a two-way data communication coupling to a network link 120 that is connected to the world wide packet data communication network now commonly referred to as the Internet 128. The Internet 128 uses electrical, electromagnetic or optical signals that carry digital data streams. The signals through the various networks and the signals on the network link 120 and through the communication interface 118, which carry the digital data to and from the server 130, are exemplary forms or carrier waves transporting the information.

In another embodiment of the server 130, interface 118 is connected to a network 122 via a communication link 120. For example, the communication interface 118 may be an integrated services digital network (ISDN) card or a modem to provide a data communication connection to a corresponding type of telephone line, which can comprise part of the network link 120. As another example, the communication interface 118 may be a local area network (LAN) card to provide a data communication connection to a compatible LAN. Wireless links may also be implemented. In any such implementation, the communication interface 118 sends and receives electrical electromagnetic or optical signals that carry digital data streams representing various types of information.

The network link 120 typically provides data communication through one or more networks to other data devices. For example, the network link 120 may provide a connection through the local network 122 to a host computer 124 or to data equipment operated by an Internet Service Provider (ISP) 126. The ISP 126 in turn provides data communication services through the Internet 128. The local network 122 and the Internet 128 both use electrical, electromagnetic or optical signals that carry digital data streams. The signals through the various networks and the signals on the network link 120 and through the communication interface 118, which carry the digital data to and from the server 130, are exemplary forms or carrier waves transporting the information.

The server 130 can send/receive messages and data, including e-mail program code, through the network, the network link 120 and the communication interface 118. Further, the communication interface 118 can comprise of a USB/Tuner and the network link 120 may be an antenna or cable for connecting the server 130 to a cable provider, satellite provider or other terrestrial transmission system for receiving messages, data and program code from another source.

The example versions of the invention described herein are implemented as logical operations in a distributed processing system such as the system 100 including the servers 130. The logical operations of the present invention can be implemented as a sequence of steps executing in the server 130, and, as interconnected machine modules, within the system 100. The implementation is a matter of choice and can depend on performance of the system 100 implementing the invention. As such, the logical operations constituting said example versions of the invention are referred to as operations, steps or modules.

Similar to a server 130 described above, a client device 101 can include a processor, memory, storage device, display, input device and communication interface (e.g., e-mail interface) for connecting the client device to the Internet 128, the ISP 126, or LAN 122, for communication with the servers 130.

The system 100 can further include computers (e.g., personal computers, computing nodes) 105 operating the same manner as client devices 101, wherein a user can utilize one or more computers 105 to manage data in the server 130.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device. The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read-only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters. In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for prioritizing log file events for scheduling of jobs on a computing system, the method comprising:
    logging events concerning each job execution plan, in a log file on a storage device, wherein the events concerning each job execution plan comprise state information for scheduled jobs in the computing system;
    for disaster recovery, prioritizing logged events based on corresponding job urgency and relevance level; and
    performing recovery by selectively reapplying the events of log files for scheduled jobs based on last known state information in the log files, in the priority order starting from each initial job execution plan.

2. The method of claim 1, wherein prioritizing logged events further comprises:
    identifying subsets of logged events, wherein:
        in each subset, the events are to be replayed in the same order, and subsets of events can be replayed in any order; and
        in each subset, corresponding jobs share dependency information.

3. The method of claim 2, wherein prioritizing logged events further comprises:
    assigning a priority to each subset, including:
        for a subset concerning a set of completed execution jobs, assigning a lower priority than subsets concerning a set of incomplete execution jobs.

4. The method of claim 3, wherein assigning a priority to each subset further comprises:
for a subset concerning a set of incomplete execution jobs including critical jobs, assigning a higher priority than a subset concerning a set of incomplete execution jobs without critical jobs.

5. The method of claim 4, wherein assigning a priority to each subset further comprises:
for a subset concerning a set of incomplete execution jobs including critical jobs having a first deadline, assigning a higher priority than a subset concerning a set of incomplete execution jobs including critical jobs having a second deadline, where the second deadline is later than the first deadline.

6. The method of claim 5, wherein assigning a priority to each subset further comprises:
for multiple subsets each concerning a set of incomplete execution jobs including critical jobs, assigning priority by:
evaluating a function for each subset based on the concerned job completion deadlines; and
assigning higher priority to the subsets based on the corresponding functions.

7. The method of claim 6, wherein performing recovery further includes performing recovery by reapplying the events of log files in the priority order such that more urgent and relevant jobs are recovered first, wherein status of each job execution plan is restored to a current status based on a last known state of the computing system.

8. A system for prioritizing log file events for scheduling of jobs on a computing system, the system comprising:
a processor;
an event logger, executable on the processor, configured for logging events concerning each job execution plan, in a log file repository device, wherein the events concerning each job execution plan comprise state information for scheduled jobs in the computing system;
a prioritization module configured such that for disaster recovery the prioritization module prioritizes logged events based on corresponding job urgency and relevance level; and
a recovery module configured for performing recovery by selectively reapplying the events of log files for scheduled jobs based on last known state information in the log files, in the priority order starting from each initial job execution plan.

9. The system of claim 8, wherein the prioritization module is further configured for prioritizing logged events by:
identifying subsets of logged events, wherein:
in each subset, the events are to be replayed in the same order, and subsets of events can be replayed in any order; and
in each subset, corresponding jobs share dependency information.

10. The system of claim 9, wherein the prioritization module is further configured for prioritizing logged events by:
assigning a priority to each subset, including:
for a subset concerning a set of completed execution jobs, assigning a lower priority than subsets concerning a set of incomplete execution jobs.

11. The system of claim 10, wherein the prioritization module is further configured for prioritizing logged events by:
for a subset concerning a set of incomplete execution jobs including critical jobs, assigning a higher priority than a subset concerning a set of incomplete execution jobs without critical jobs.

12. The system of claim 11, wherein the prioritization module is further configured for prioritizing logged events by:
for a subset concerning a set of incomplete execution jobs including critical jobs having a first deadline, assigning a higher priority than a subset concerning a set of incomplete execution jobs including critical jobs having a second deadline, where the second deadline is later than the first deadline.

13. The system of claim 12, wherein the prioritization module is further configured for prioritizing logged events by:
for multiple subsets each concerning a set of incomplete execution jobs including critical jobs, assigning priority by:
evaluating a function for each subset based on the concerned job completion deadlines; and
assigning higher priority to the subsets based on the corresponding functions.

14. The system of claim 13, wherein the recovery module is further configured for performing recovery by reapplying the events of log files in the priority order such that more urgent and relevant jobs are recovered first, wherein status of each job execution plan is restored to a current status based on a last known state of the computing system.

15. A computer program product for prioritizing log file events for scheduling of jobs on a computing system, said computer program product comprising:
a non-transitory computer usable medium having a computer readable program code embodied therewith, wherein the computer readable program code when executed on a computer causes the computer to:
log events concerning each job execution plan, in a log file repository device, wherein the events concerning each job execution plan comprise state information for scheduled jobs in the computing system;
for disaster recovery, prioritize logged events based on corresponding job urgency and relevance level; and
perform recovery by selectively reapplying the events of log files for scheduled jobs based on last known state information in the log files, in the priority order starting from each initial job execution plan, such that more urgent and relevant jobs are recovered first.

16. The computer program product of claim 15 further comprising computer readable program code for prioritizing logged events by:
identifying subsets of logged events, wherein:
in each subset, the events are to be replayed in the same order, and subsets of events can be replayed in any order; and
in each subset, corresponding jobs share dependency information.

17. The computer program product of claim 16 further comprising computer readable program code for prioritizing logged events by:
assigning a priority to each subset, including:
for a subset concerning a set of completed execution jobs, assigning a lower priority than subsets concerning a set of incomplete execution jobs.

18. The computer program product of claim 17 further comprising computer readable program code for prioritizing logged events by:
for a subset concerning a set of incomplete execution jobs including critical jobs,
assigning a higher priority than a subset concerning a set of incomplete execution jobs without critical jobs.

19. The computer program product of claim 18 further comprising computer readable program code for prioritizing logged events by:
 for a subset concerning a set of incomplete execution jobs including critical jobs having a first deadline, assigning a higher priority than a subset concerning a set of incomplete execution jobs including critical jobs having a second deadline, where the second deadline is later than the first deadline.

20. The computer program product of claim 19 further comprising computer readable program code for prioritizing logged events by:
 for multiple subsets each concerning a set of incomplete execution jobs including critical jobs, assigning priority by:
  evaluating a function for each subset based on the concerned job completion deadlines; and
  assigning higher priority to the subsets based on the corresponding functions.

* * * * *